United States Patent
Abe

(10) Patent No.: US 7,178,548 B2
(45) Date of Patent: Feb. 20, 2007

(54) DRY SAFETY DEVICE FOR AN INFLAMMABLE GAS

(75) Inventor: Masayuki Abe, Tokyo (JP)

(73) Assignee: Kabushiki Kaisha Sanki (JP)

( * ) Notice: Subject to any disclaimer, the term of this patent is extended or adjusted under 35 U.S.C. 154(b) by 239 days.

(21) Appl. No.: 10/834,583

(22) Filed: Apr. 29, 2004

(65) Prior Publication Data

US 2005/0045226 A1    Mar. 3, 2005

(30) Foreign Application Priority Data

Sep. 2, 2003    (JP)    ............................... 2003-309560

(51) Int. Cl.
*F16K 17/14*    (2006.01)
(52) U.S. Cl. .................. 137/75; 137/79; 137/457; 137/512.4; 220/88.2; 431/346; 48/192
(58) Field of Classification Search ............... 137/75, 137/457, 79, 72, 460, 461, 512, 512.4; 220/89.4, 220/88.2; 48/192; 431/346
See application file for complete search history.

(56) References Cited

U.S. PATENT DOCUMENTS

| | | | | |
|---|---|---|---|---|
| 2,332,380 A | * | 10/1943 | Hess | 48/192 |
| 3,368,581 A | * | 2/1968 | Glover, Jr. | 137/460 |
| 3,933,444 A | * | 1/1976 | Kilgore | 48/192 |
| 4,251,226 A | * | 2/1981 | Nishikawa | 48/192 |
| 5,107,891 A | * | 4/1992 | Abe | 137/557 |
| 6,820,633 B2 | * | 11/2004 | Liu | 137/73 |
| 2005/0217725 A1 | * | 10/2005 | Moore et al. | 137/75 |

FOREIGN PATENT DOCUMENTS

| | | | |
|---|---|---|---|
| JP | 409021528 A | * | 1/1997 |
| JP | 2001-289346 | * | 10/2001 |

* cited by examiner

*Primary Examiner*—Eric Keasel
*Assistant Examiner*—Craig M. Schneider
(74) *Attorney, Agent, or Firm*—Adams & Wilks

(57) ABSTRACT

A dry safety device for an inflammable gas comprises a case main body having a gas passage which terminates at one end in a primary side open port connectable to a source of inflammable gas and terminates at the other end in a secondary side open port connectable to a gas-fired appliance. A spindle undergoes sliding movement in the case main body between an open position for opening the gas passage and a closed position for closing the gas passage, and a spindle spring normally urges the spindle to the open position and permits the spindle to move to the closed position in response to a counter-flow pressure exerted on the spindle by a counter flow of inflammable gas directed from the secondary side open port to the primary side open port. A flame-extinguishing filter disposed in the gas passage extinguishes a back fire that may occur during a counter flow of inflammable gas, and a normally open shutoff valve disposed in the gas passage upstream from the filter closes the gas passage when an ambient temperature exceeds a given value.

20 Claims, 4 Drawing Sheets

DRY SAFETY DEVICE FOR AN INFLAMMABLE GAS

BACKGROUND OF THE INVENTION

1. Technical Field of the Invention

The present invention relates generally to a dry safety device for an inflammable gas, and more particularly to a dry safety device for shutting off a gas passage to prevent adverse effects to the supply source of inflammable gas when a dangerous condition such as back fire or fire occurs during a gas welding operation or a gas cutting operation.

2. Description of Related Art

As a safety measure in gas welding or gas cutting operations using an inflammable gas, it is known to provide a dry gas safety device having a gas passage shutoff mechanism to prevent a counter flow or backflow of the inflammable gas accompanied with back fire that may occur in a hose connecting a burner torch to a bomb filled with the inflammable gas. Such a dry safety device is constructed so that when a counter flow of gas occurs from a secondary side toward a primary side, the device is automatically operated by the counter-flow pressure to shut off the gas passage, and when the counter-flow phenomenon ends or disappears, the shutoff mechanism can be manually reset and used again. However, this safety device is not constructed to prevent the counter flow of gas in situations when a counter-flow pressure is not produced. One example of such a situation is in normal use conditions, when a valve of the burner torch is closed, and the inflammable gas remains in the hose. In such a state, if a serious situation occurs in the surrounding environment and the ambient temperature is raised too high, or if a fire happens, the hose may be broken and fire may enter the hose, creating a very dangerous condition. Namely, in a conventional dry safety device which is operated by the counter-flow pressure produced by back fire, in the event the hose is broken and the gas escaping from the broken hose simply burns, a counter-flow pressure is not generated and in such a state, this dry safety device does not function.

In order to overcome this drawback, JP-A-2001-289346 proposes a dry safety device for an inflammable gas comprising a passage shutoff mechanism to shut off the gas passage by use of the backflow pressure, which further comprises a high-temperature shutoff mechanism capable of shutting off the gas passage in which the inflammable gas flows even when the ambient temperature is raised high. This high-temperature shutoff mechanism has a valve seat located at a secondary side open port from which the inflammable gas exits the dry safety device and flows to the burner torch, and a shutoff valve temporarily fixed by a low-temperature solder in a retracted position, opposing the valve seat. When a fire occurs and the ambient temperature rises, the low-temperature solder is melted, and the temporarily fixed shutoff valve is released and moved by a spring to an extended position where the extended shutoff valve presses against the valve seat to close the gas passage.

Usually, at the outer periphery of the shutoff valve, an elastic packing such as O-ring is provided so that when the shutoff valve is pressed against the valve seat, the elastic packing will closely fit on the valve seat in a gas-tight manner to securely shut off the gas passage. However, since this shutoff valve is disposed at the secondary side open port, when a counter flow accompanied by back fire occurs, flames that reach the shutoff valve pass the periphery of the elastic packing and damage the packing. As mentioned above, the known dry safety device is constructed so that when the counter-flow phenomenon from the secondary side toward the primary side disappears, the passage shutoff mechanism is reset and used again. Accordingly, whenever the counter-flow phenomenon accompanied by back fire occurs, the elastic packing of the shutoff valve is further deteriorated. As a result, when a fire occurs near the shutoff valve without generating a counter-flow pressure, even if the shutoff valve of the high temperature shutoff mechanism moves to the extended position, the gas passage may sometimes not be securely closed.

SUMMARY OF THE INVENTION

It is an object of the present invention to provide a dry safety device for an inflammable gas which can shut off the gas passage not only when counter flow of the inflammable gas occurs but also when the ambient temperature rises too high.

It is another object of the present invention to provide a dry safety device for an inflammable gas which has a high-temperature shutoff mechanism having a shutoff valve located at a position where the shutoff valve is not exposed to flames during back fire so that the high-temperature shutoff mechanism can be securely operated when serious situations such as fire occur.

A further object of the present invention is to provide a dry safety device for an inflammable gas which is rugged in construction and reliable in operation under a wide range of conditions.

The foregoing as well as other objects of the invention are realized by a dry safety device for an inflammable gas comprising a case main body having a gas passage formed therein which has a primary side open port which is communicated to a supply source side of inflammable gas and a secondary side open port which is communicated to a burner torch, a spindle movable between a secondary side position where the gas passage is opened and a primary side position where the gas passage is closed, a spindle spring for urging the spindle toward the secondary side position and permitting the spindle to move toward the primary side position by a counter-flow pressure of the inflammable gas directed from the secondary side open port toward the primary side open port, a filter disposed near the secondary side open port for extinguishing a back fire occurring together with the counter flow, a shutoff valve movable to an extended position for closing the gas passage and being temporarily fixed in a retracted position by a low temperature-melting material so that when an ambient temperature becomes high, the low temperature-melting material melts to permit the shutoff valve to move to the extended position, and a shutoff valve spring for urging the shutoff valve toward the extended position, wherein the shutoff valve is disposed in the gas passage at a position nearer to the primary side open port than to the filter.

According to the dry safety device for an inflammable gas of the present invention, when a counter flow accompanied by back fire occurs from the secondary side open port, the back fire can be extinguished by the filter, and the spindle is moved from the secondary side position to the primary side position by the counter-flow pressure to close the gas passage, thereby preventing the back fire from reaching the primary side. Further, when the ambient temperature becomes high by, for example, the occurrence of a fire, the low temperature-melting material is melted and the shutoff valve moves to the extended position to close the gas passage and prevent the inflammable gas from flowing out.

In addition, since the shutoff valve is disposed in the gas passage at a position nearer to the primary side open port than to the filter which extinguishes the back fire, the back fire will not reach the shutoff valve and the elastic packing provided on the shutoff valve will not be damaged by the fire. As a result, it is possible to securely shut off the gas passage at times of high temperature and use the shutoff valve for a long period of time.

DETAILED DESCRIPTION OF PREFERRED EMBODIMENTS OF THE INVENTION

Figure 1:
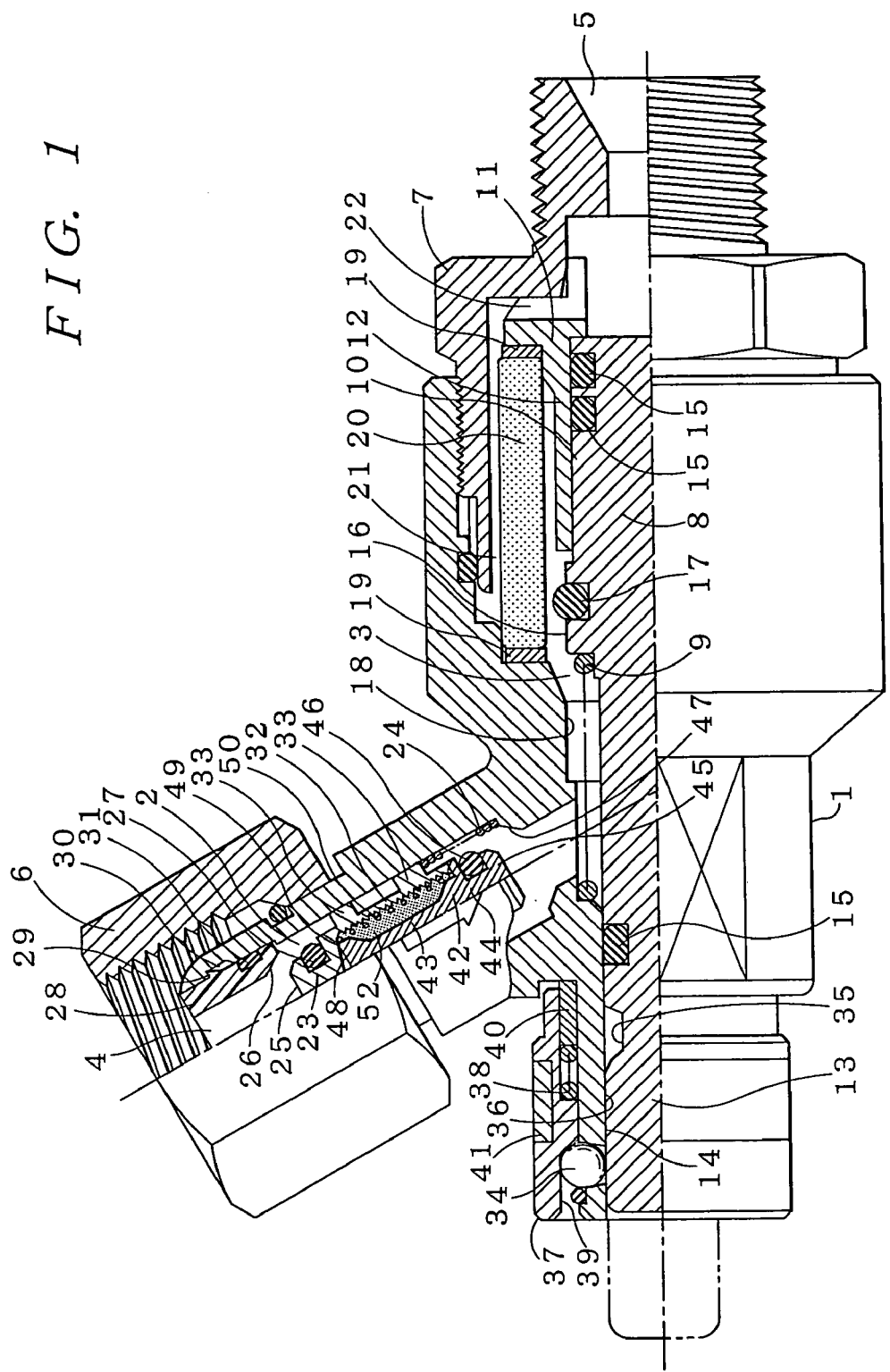
FIG. 1 is a side view, partly in cross section, of one embodiment of a dry safety device for an inflammable gas according to the principles of the present invention showing the device in a state where gas flows therethrough under normal conditions.

FIG. 1 shows an embodiment of a dry safety device for an inflammable gas according to the present invention. The dry safety device has a case main body (1) having therein a gas passage comprised of a first passage (2) and a second passage (3) which extends in a direction crossing the first passage (2). The first passage (2) has an inlet end terminating in a primary side open port (4) for connection to a supply source of inflammable gas, and the second passage (3) has an outlet end terminating in a secondary side open port (5) for connection to a burner torch. Around the primary side open port (4) of the case main body (1), a cap nut (6) is provided for detachable connection to a hose or the like which communicates to a source of pressurized inflammable gas, such as a bomb (not shown). On the secondary side of the case main body (1), a secondary side main body (7) having the secondary side open port (5) is screwed, and a secondary side gas-fired appliance such as a burner torch (not shown) is detachably connected to the secondary side main body (7).

In the second passage (3) of the case main body (1), a spindle (8) is slidably disposed to undergo sliding movement in an axial direction. The spindle (8) is movable between a secondary side position (the rightward position shown in FIG. 1) where the passage (3) is opened and a primary side position (the leftward position shown in FIG. 3) where the passage (3) is closed, and the spindle (8) is urged by a spindle spring (9) toward the secondary side position. One end portion (10) of the spindle (8) extends toward the secondary side open port (5) and is slidably inserted into an inner cylinder (12) of a seat (11) supported by the secondary side main body (7). The other end portion (13) of the spindle (8) is slidably inserted into a reception hole (14) disposed along an extended line of the second passage (3) in the case main body (1). O-rings (15),(15),(15) are provided on the outer periphery of the spindle (8) at the respective insertion portions for sealing the space between the slidable spindle (8) and the mating surfaces along which the spindle slides to prevent leakage of the inflammable gas.

A valve element comprised of a resiliently compressible packing (17) is disposed at a large diameter portion (16) of the spindle (8), and when the spindle (8) is moved to the primary side position (leftward movement in FIG. 1) by the counter-flow pressure, the packing (17) is brought into sealing engagement with a valve seat defined by an inner face (18) of the second passage (3) to sealingly close the gas passage. The packing (valve element) (17) extends circumferentially around the periphery of the spindle (8), and the inner face (valve seat) (18) extends circumferentially around the periphery of the second passage (3).

In the second passage (3), a flame-extinguishing filter (20) having a flame-extinguishing function and a cylindrical shape is provided. The filter (20) is clamped and held by the case main body (1) through the seat (11) and a packing (19) when the secondary side main body (7) is screwed onto the case main body (1). A passage (21) is formed around the filter (20) and communicates with the secondary side open port (5) through a radially extending passage (22) formed in the seat (11). When a counter flow accompanied with back fire occurs from the secondary side open port (5) toward the primary side open port (4), the filter (20) extinguishes the back fire and permits only the gas to flow therethrough.

In the first passage (2), a check valve (23) is provided to close the first passage in the event of a drop in the ordinary flow pressure or the occurrence of a counter-flow pressure. As shown in FIG. 1, in the case of an ordinary flow directed from the primary side open port (4) toward the secondary side open port (5), a valve member in the form of a check valve main body (25) is movably disposed in the first passage (2) so that it will move toward the secondary side by the ordinary flow pressure acting against the spring pressure exerted by a check valve spring (24). When the flow pressure of the ordinary flow supplied from the primary side becomes larger than the spring pressure of the check valve spring (24), the check valve main body (25) is urged away from a valve seat (26) provided in the gas passage to open the first passage (2). On the other hand, as shown in FIG. 3, when the flow pressure of the gas decreases below a given level, or a counter-flow (backflow) pressure is exerted from the secondary side, the check valve main body (25) is pressed against the valve seat (26), and an O-ring (27) carried by the check valve main body (25) elastically deforms against the valve seat (26) to sealingly close the first passage (2).

Figure 2:
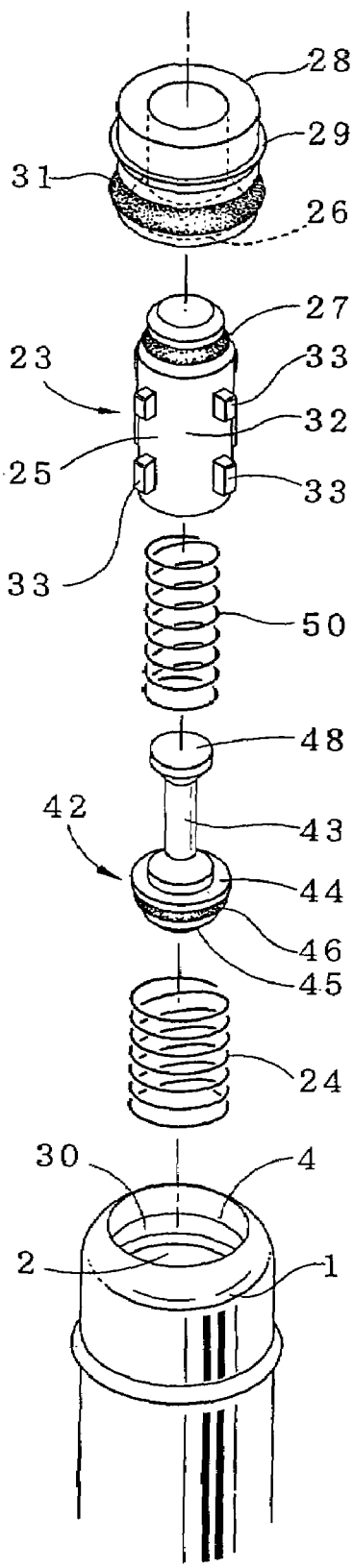
FIG. 2 is an exploded perspective view of a check valve and a shutoff valve.

The valve seat (26) is formed on an inner surface of a packing seat main body (28) of a cylindrical shape and is preferably made of a synthetic resin material. The packing seat main body (28) has a latching pawl (29) on its outer periphery as shown in FIG. 2, and is inserted into the case main body (1) through the primary side open port (4). The packing seat main body (28) is attached to the case main body (1) by engaging the latching pawl (29) with an annular groove (30) formed on the inner surface of the case main body. On the outer periphery of the packing seat main body (28), an O-ring (31) is provided to maintain a gas-tight seal. When the packing seat main body (28) is attached, it can be fixed to the case main body (1) by simply thrusting it axially into the case main body (1). Accordingly, since the packing seat main body (28) is not turned or twisted, as would be the case if attachment were by screw threads, the O-ring (31) is not pulled in a circumferential direction or distorted, the attachment condition can be maintained, and the sealing can be made securely. Further, around a holding cylinder (32) of the check valve main body (25), small radially extending protrusions (33) are provided for sliding contact with the inner surface of the first passage (2) as shown in FIG. 2, by which the first passage runs through the outer periphery of the check valve main body (25).

At the end portion (13) of the spindle (8), holding means is provided for releasably holding the spindle at the primary side position when the spindle (8) moves to the primary side by the counter-flow pressure overcoming the spring pressure exerted by the spindle spring (9). The holding means may be constructed in various forms, one example of which is described below. In FIG. 1, a communicating groove (35) is formed on the spindle (8) so that a ball (34) will be engaged therein when the spindle (8) moves to the primary side position, and a sleeve spring (38) and a slidable sleeve (37) having a small diameter portion (36) for pressing the ball (34) are provided around the case main body (1). When the sleeve (37) is moved toward the secondary side relative to the case main body (1) so that a large diameter portion (39) of the sleeve (37) is placed at a position corresponding to the ball (34), the ball (34) retracts from the communicating groove (35) allowing the spindle (8) to move to the secondary side position by the spring (9), whereby the flow passage is opened (see FIG. 1).

Figure 3:
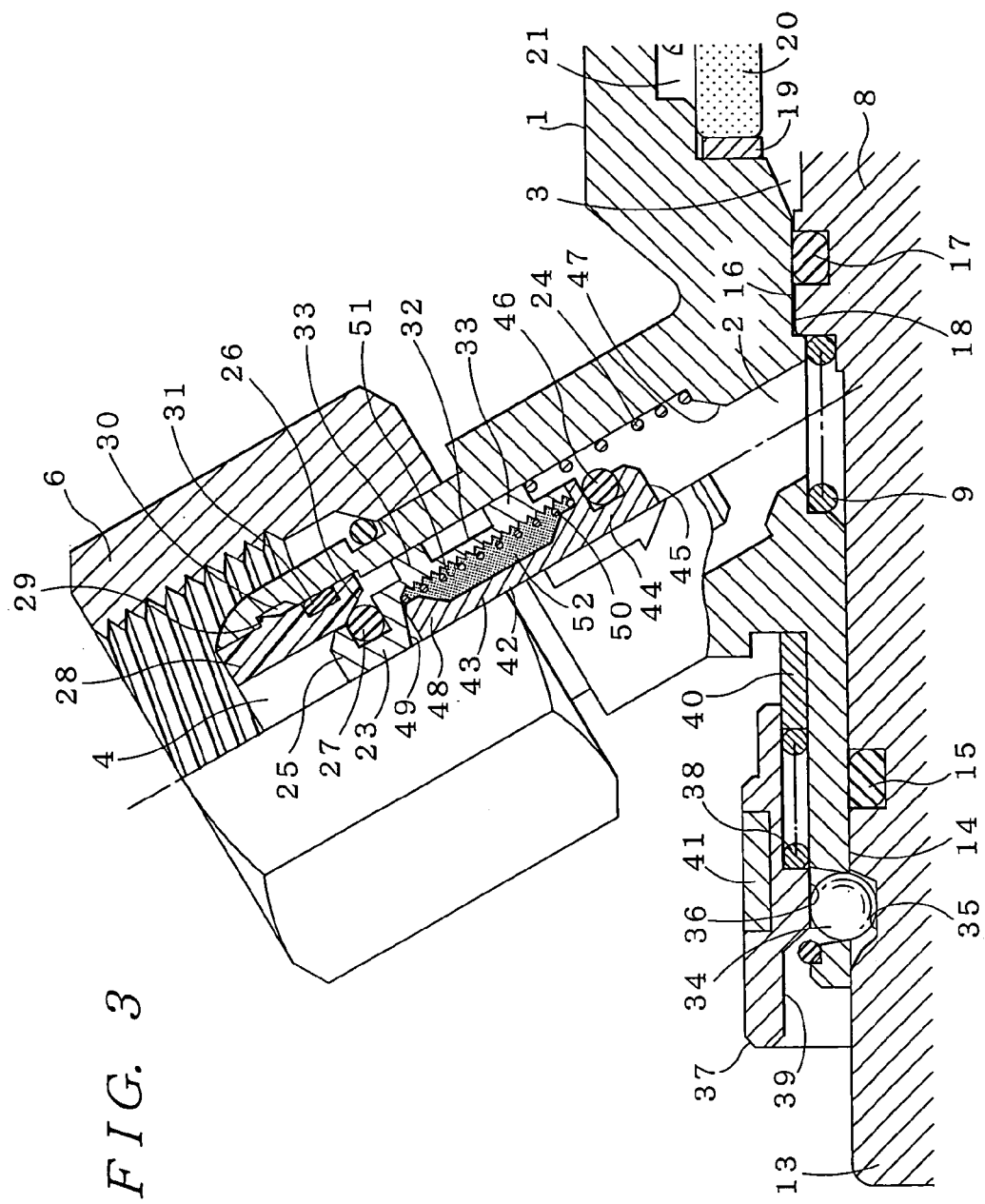
FIG. 3 is a partial cross-sectional view of the dry safety device in a state where a spindle moves to a primary side position.

When the spindle moves to the primary side position from the state shown in FIG. 1, the ball (34) enters the communicating groove (35) as shown in FIG. 3, and the outer periphery of the ball (34) is pressed by the small diameter portion (36) of the sleeve (37), thereby releasably holding the spindle (8) at the primary side position. A color ring (40) is provided on the case main body (1) and is externally visible when the spindle (8) moves to the position where the sleeve (37) holds the spindle (8), thereby providing a visual indication that the spindle (8) is present at the primary side position, i.e., a counter-flow preventing position. In addition, a visual indicator in the form of a color ring (41) is fitted around the sleeve (37) and has a color or color pattern denoting the type or kind of inflammable gas being used, thereby providing a visual indication of the type or kind of gas flowing through the gas passage.

At an appropriate position in the gas passage nearer to the primary side open port (4) than to the filter (20), a shutoff valve (42) is provided for closing the flow passage when the ambient temperature becomes higher than or exceeds a given value. The shutoff valve (42) can be provided at any appropriate position in the gas passage so long as it is upstream from the filter (20), and in the embodiment as shown in FIG. 1, it is provided inside of the check valve (23) which is disposed in the first passage (2) upstream of the filter (20). Referring to FIGS. 1 and 2, the shutoff valve (42) has a shutoff valve main body (44) having a small diameter rod portion (43) inserted into the hollow interior of the holding cylinder (32) of the check valve main body (25), and a valve element comprised of an O-ring (46) is fitted to a forward end (45) of the shutoff valve main body (44). The O-ring (46) is engageable with a valve seat (47) formed in the first passage (2) to shut off the gas flow through the gas passage.

At the rearward end of the shutoff valve main body (44), a head portion (48) is formed. Between a bottom portion (49) of the holding cylinder (32) and the forward end (45), a shutoff valve spring (50) is provided for urging the shutoff valve main body (44) toward the extended position.

Figure 4:
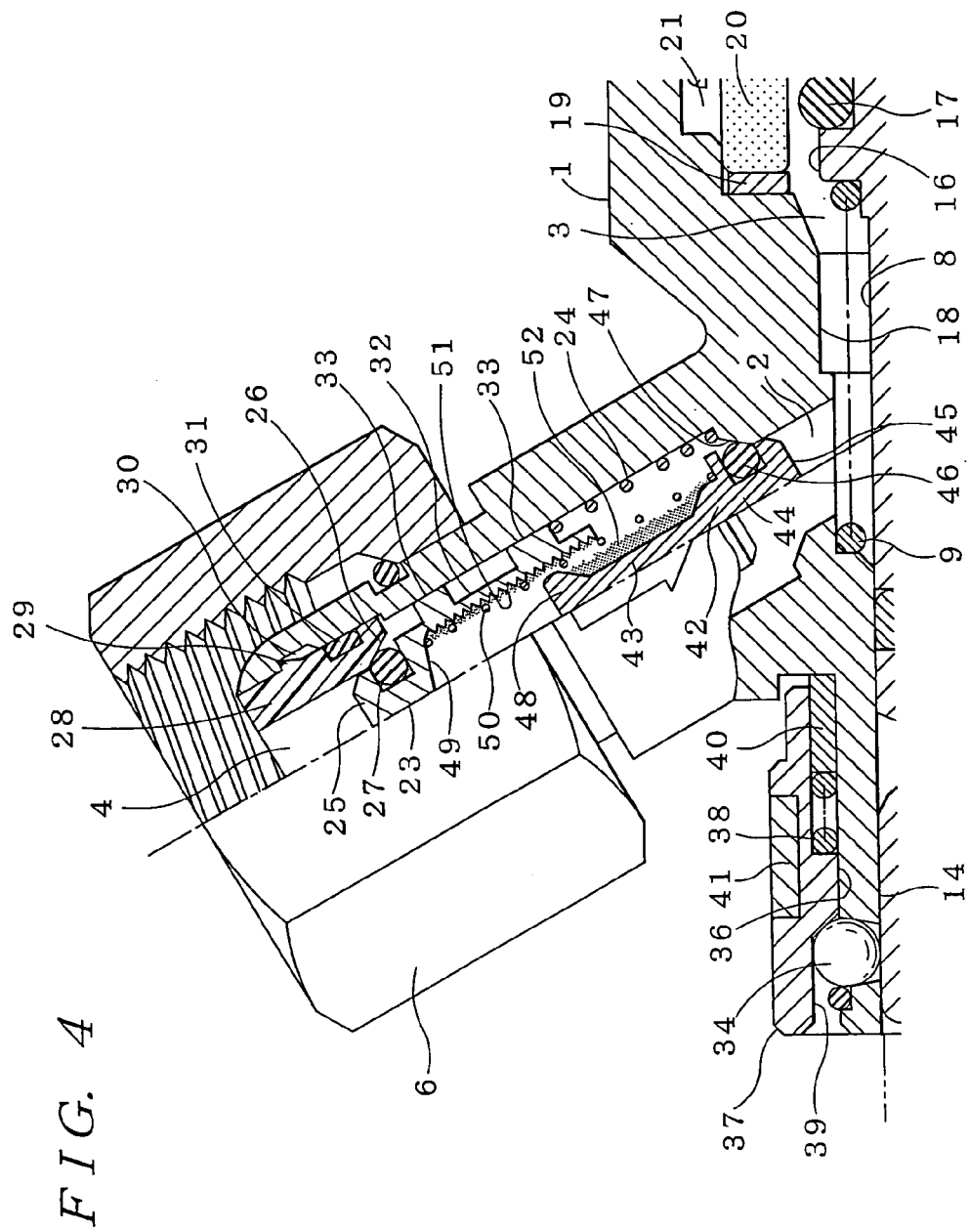
FIG. 4 is a partial cross-sectional view of the dry safety device in a state where a shutoff valve moves to an extended position.

As shown in FIGS. 1, 3 and 4, the inner surface of the holding cylinder (32) is provided with an irregular, uneven surface (51), which may be formed, for example, by a thread groove. In the space between the irregular surface (51) and the rod portion (43), a temperature-responsive material such as a low temperature-melting material (52), for example, a low-temperature solder, is charged to temporarily fix the shutoff valve main body (44) in the retracted position. As the solder, a material which melts at about 95° C. is used, but a solder having a melting point higher or lower than 95° C. or another appropriate temperature-responsive material may be used. As will be apparent to those skilled in the art, the structure for temporarily fixing the shutoff valve main body (44) to the holding cylinder (32) is not limited to that shown in FIG. 1 and any other appropriate structure may be used.

During use of the dry safety device, the case main body (1) is connected to a bomb (not shown) at the primary side by means of the cap nut (6) and inflammable gas is supplied from the bomb to the first passage (2). The check valve main body (25) of the check valve (23) is moved to the open position shown in FIG. 1 by the ordinary flow pressure overcoming the spring pressure of the spring (24). Then the gas enters the second passage (3), flows toward the secondary side through the passages (21), (22), and is supplied to the burner torch (not shown).

As shown in FIG. 3, in the event a counter flow of the inflammable gas accompanied with back fire occurs, the check valve (23) closes the passage (2) by the counter-flow pressure, and, by the counter-flow pressure acting on the end portion (10) at the secondary side of the spindle (8), the spindle (8) moves leftwardly in FIG. 1, thereby closing the second passage (3). At this moment, the back fire directed to the primary side is extinguished by the flame-extinguishing filter (20) and the flames do not reach the position of the shutoff valve (42). The spindle (8) is held by the holding means at the counter-flow position, but as mentioned above, when the counter-flow phenomenon disappears, the spindle (8) is moved rightwardly and returned to the position shown in FIG. 1 by manually operating the sleeve (37).

As shown in FIG. 4, in the event the temperature of the environment surrounding the case main body (1) becomes higher than the given value for any reason, such as an abnormal increase of temperature or due to fire, the low temperature-melting material (52) melts, and the shutoff valve main body (44) is extended from the retracted position (FIG. 3) toward the secondary side by the spring (50) and pressed against the valve seat (47) located in the passage (FIG. 4). The supply of the inflammable gas to the secondary side is thereby quickly stopped. At this time, since the flames of the back fire do not reach the part of the O-ring (46) provided at the shutoff valve main body (44) as mentioned above, the O-ring is not damaged by the back fire and the O-ring remains securely attached to the valve seat (47) so as to maintain the passage (2) closed.

Obvious modifications and changes will become apparent to those of ordinary skill in the art, and the present invention includes all such modifications and changes that fall within the scope of the appended claims.

I claim:

1. A dry safety device for an inflammable gas, comprising:
   a case main body having a gas passage formed therein which has a primary side open port connectable to a supply source of inflammable gas during use of the dry safety device and a secondary side open port connectable to a burner torch;
   a spindle movable between a secondary side position where the gas passage is opened and a primary side position where the gas passage is closed;
   a spindle spring for urging the spindle toward the secondary side position and permitting the spindle to move toward the primary side position by a pressure of a counter flow of inflammable gas directed from the secondary side open port toward the primary side open port;

a flame-extinguishing filter disposed near the secondary side open port for extinguishing a back fire that may occur together with the counter flow of inflammable gas;

a shutoff valve disposed in the gas passage at a position nearer to the primary side open port than to the filter and movable to an extended position for closing the gas passage and being temporarily fixed in a retracted position by a low temperature-melting material so that when an ambient temperature becomes higher than a given value, the low temperature-melting material is melted to permit the shutoff valve to move to the extended position; and a shutoff valve spring for urging the shutoff valve toward the extended position.

2. A dry safety device for an inflammable gas according to claim 1; further including a check valve positioned in the gas passage near the primary side open port and movable to open the gas passage by an ordinary flow of inflammable gas directed from the primary side open port toward the secondary side open port, the shutoff valve being disposed inside of the check valve.

3. A dry safety device for an inflammable gas according to claim 2; wherein the check valve has a check valve main body having a holding cylinder; a shutoff valve main body of the shutoff valve and the shutoff valve spring being inserted into the holding cylinder; the low temperature-melting material being charged in a space between the shutoff valve main body and the holding cylinder; and the shutoff valve main body being temporarily fixed in the retracted position.

4. A dry safety device for an inflammable gas according to claim 3; wherein the check valve main body having the shutoff valve main body temporarily fixed therein is inserted into the gas passage through the primary side open port, and a packing seat main body having a valve seat is inserted into the check valve main body from the outside of the check valve main body, whereby the check valve main body and the packing seat main body are incorporated into the case main body.

5. A dry safety device for an inflammable gas according to claim 4; wherein the packing seat main body has a latching pawl on its outer periphery, the latching pawl engaging with an annular groove formed on an inner surface of the case main body to fix the packing seat main body to the case main body.

6. A dry safety device for an inflammable gas according to claim 1; wherein the gas passage comprises a first passage in communication with the primary side open port and a second passage which extends in a direction crossing the first passage and in communication with the secondary side open port, the shutoff valve being disposed in the first passage, and the spindle and the filter being disposed in the second passage.

7. A dry safety device for an inflammable gas according to claim 1; wherein the case main body is provided with holding means for releasably holding the spindle in the primary side position after movement of the spindle thereto by the counter-flow pressure of the inflammable gas.

8. A dry safety device for an inflammable gas, comprising: a case main body having therein a gas passage, the gas passage terminating at one end in a primary side open port connectable to a source of inflammable gas during use of the dry safety device and terminating at the other end in a secondary side open port connectable to a gas-fired appliance; a spindle slidably disposed in the case main body for sliding movement between an open position for opening the gas passage to allow the flow of inflammable gas therethrough in a downstream direction from the primary side open port to the secondary side open port and a closed position for closing the gas passage; a spindle spring for normally urging the spindle to the open position and permitting the spindle to move to the closed position in response to a counter-flow pressure exerted on the spindle by a counter flow of inflammable gas directed from the secondary side open port to the primary side open port; a flame-extinguishing filter disposed in the gas passage for extinguishing a back fire that may occur during a counter flow of inflammable gas; and a normally open shutoff valve disposed in the gas passage upstream from the filter for closing the gas passage when an ambient temperature exceeds a given value.

9. A dry safety device for an inflammable gas according to claim 8; wherein the case main body has a valve seat extending circumferentially around the periphery of the gas passage, and the spindle has a valve element extending circumferentially around the periphery thereof, the valve element engaging with the valve seat to close the gas passage when the spindle is in the closed position.

10. A dry safety device for an inflammable gas according to claim 9; wherein the shutoff valve is disposed upstream from the valve seat.

11. A dry safety device for an inflammable gas according to claim 10; wherein the filter is disposed downstream from the valve seat.

12. A dry safety device for an inflammable gas according to claim 8; wherein the shutoff valve comprises a valve seat disposed in the gas passage, a movable valve element disposed in the gas passage for movement between a retracted position wherein the valve element is spaced from the valve seat to open the gas passage and an extended position wherein the valve element engages with the valve seat to close the gas passage, a spring for urging the valve element toward the closed position, and a temperature-responsive material for releasably holding the valve element in the retracted position when the ambient temperature is below the given value and releasing the valve element for movement by the spring to the extended position when the ambient temperature exceeds the given value.

13. A dry safety device for an inflammable gas according to claim 12; wherein the temperature-responsive material comprises a low-temperature solder.

14. A dry safety device for an inflammable gas according to claim 8; further including a normally closed check valve disposed in the gas passage for closing the gas passage and being movable to open the gas passage by the flow of inflammable gas in a direction from the primary side open port to the secondary side open port, the shutoff valve being mounted to the check valve.

15. A dry safety device for an inflammable gas according to claim 14; wherein the check valve has a movable cylindrical valve member engageable with a valve seat disposed in the gas passage for closing the gas passage, the shutoff valve being mounted inside of the cylindircal valve member.

16. A dry safety device for an inflammable gas according to claim 15; wherein the valve seat of the check valve is formed on a cylindrical main body, the main body having a latching pawl on an outer periphery thereof, the latching pawl engaging in a groove formed on a surface of the case main body to fix the main body to the case main body.

17. A dry safety device for an inflammable gas according to claim 16; wherein the main body is formed of resin material.

18. A dry safety device for an inflammable gas according to claim 8; wherein the gas passage comprises a first passage in communication with the primary side open port and a second passage which extends in a direction crossing the first passage and in communication with the secondary side open port, the shutoff valve being disposed in the first passage, and the spindle and the filter being disposed in the second passage.

19. A dry safety device for an inflammable gas according to claim 18; further including a normally closed check valve disposed in the first passage for closing the gas passage and being movable to open the gas passage by the flow of inflammable gas in a direction from the primary side open port to the secondary side open port, the shutoff valve being mounted to the check valve.

20. A dry safety device for an inflammable gas according to claim 19; wherein the check valve has a movable cylindrical valve member engageable with a valve seat disposed in the first passage for closing the gas passage, the shutoff valve being mounted inside of the cylindircal valve member.

* * * * *